United States Patent
Gutris

[15] 3,707,037
[45] Dec. 26, 1972

[54] METHOD FOR ASSEMBLING ELECTRIC MOTORS

[72] Inventor: Giorgio Gutris, 49, Viale Certosa, Milan, Italy

[22] Filed: Nov. 3, 1970

[21] Appl. No.: 86,531

[52] U.S. Cl. ..................29/596, 310/42, 310/64, 310/89
[51] Int. Cl. ...H02k 15/00, H02k 15/14, H02k 15/16
[58] Field of Search ..............29/596; 310/42, 89, 64

[56] References Cited

UNITED STATES PATENTS

| | | | |
|---|---|---|---|
| 3,571,921 | 3/1971 | Pieper | 29/596 |
| 3,289,018 | 11/1966 | Schaefer | 310/42 |
| 1,661,135 | 2/1928 | Knight | 29/596 |
| 3,439,403 | 4/1969 | Lippmann et al. | 29/596 X |
| 3,508,327 | 4/1970 | Diederichs et al. | 29/596 |

Primary Examiner—John F. Campbell
Assistant Examiner—Carl E. Hall
Attorney—Wenderoth, Lind & Ponack

[57] ABSTRACT

The specification describes a method for assembling electric motors comprising a casing and opposite head members co-axial therewith, including the step of permanently securing said head members to said casing by inwardly clinching the end portions of said casing to the periphery of the adjacent head member, and electric motors wherein their head members are permanently secured to the motor yoke casing according to the method.

1 Claim, 7 Drawing Figures

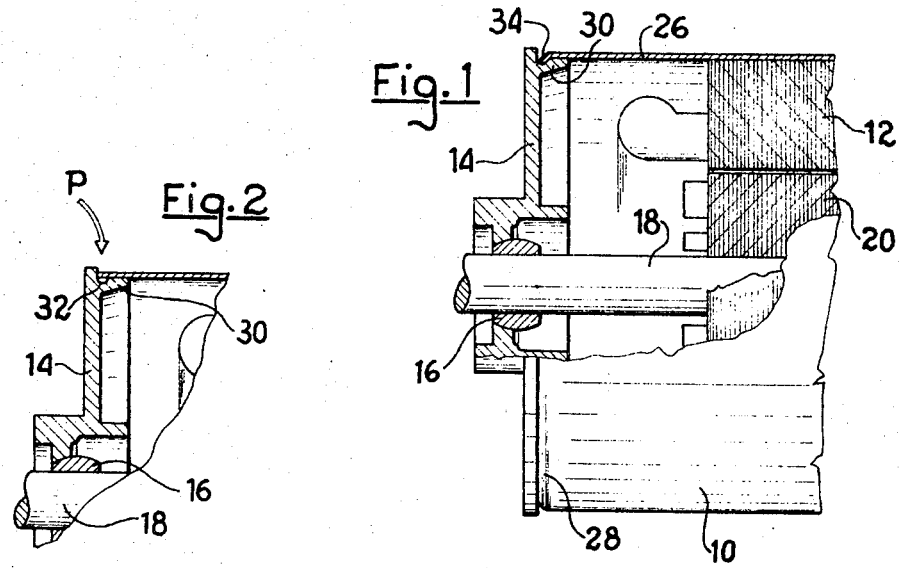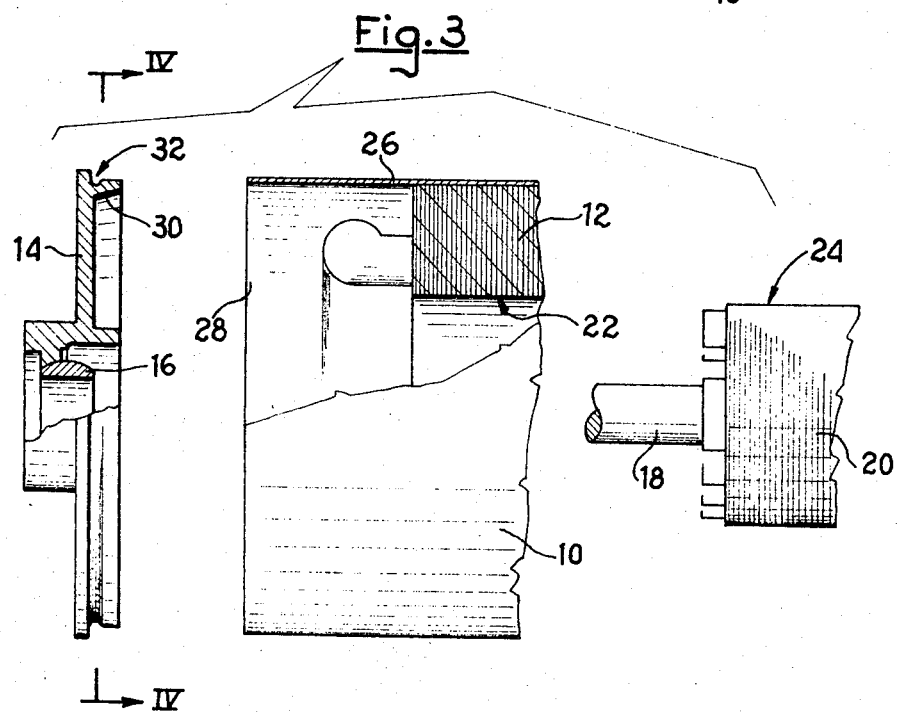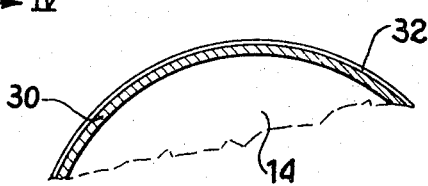

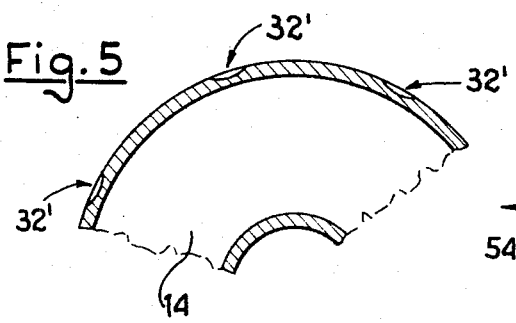
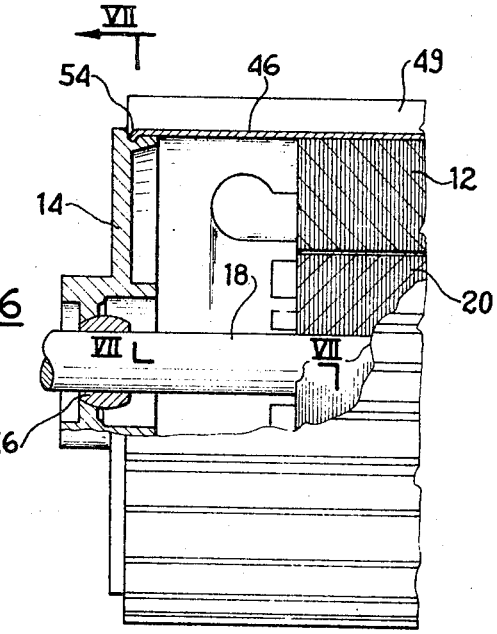
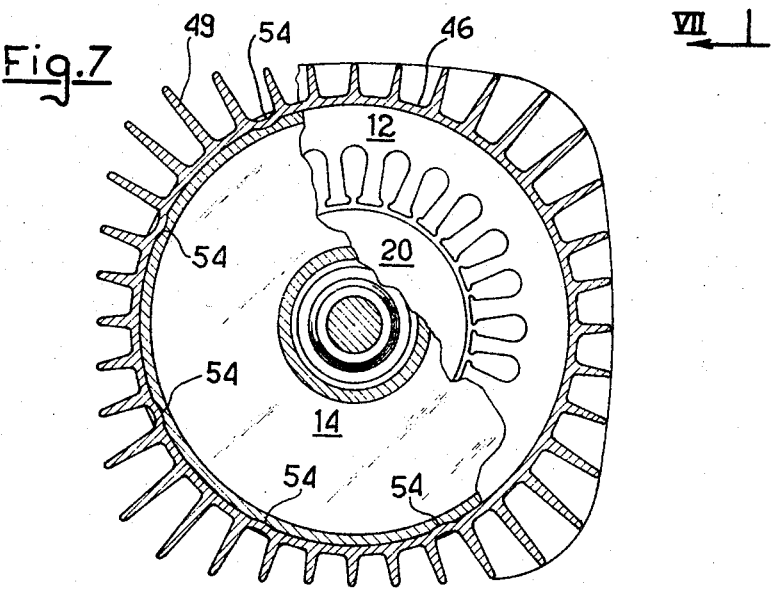
GIORGIO GUTRIS,
INVENTOR

METHOD FOR ASSEMBLING ELECTRIC MOTORS

BACKGROUND

This invention concerns a method by which the main structural components of electric motors can be predisposed for the assembling and fastening and then assembled and secured with each other. The invention also concerns the motors manufactured and in particular assembled according to said method.

The invention is concerned mainly with the production and assembling of fractional motors, having a relatively small rated output —a few hundreds of watts, at the most— as well as of those motors for which, owing both to their features and/or to conditions and requirements of installation and service, no overhauling or reconditioning operations are anticipated or planned. Otherwise stated, the invention is intended as an advance and a contribution in the field of the most modern industrial and economical trends according to which the motors, mass-produced on the basis of a highly advanced and qualified technique, should not be liable to failures or to a noticeable wear and tear under the normal operating conditions, and according to which in the exceptional event of a motor breakdown, the whole motor is replaced instead of having it repaired or reconditioned. As a matter of fact, in many cases it is both economically and technically more convenient to replace a broken-down motor than to have it repaired, since any repair is a time consuming operation, results in a more or less long discontinuation of the operation of machine or other device driven by the same motor and requires highly skilled specialists.

It has been ascertained that the conventional, heretofore followed technique of electric motor production is not up with the above outlined modern trends, though meeting all conditions as required to ensure the highest efficiency of the same motors. In fact, according to current art, a separate production and machining to close tolerance of motor casing is required, whereafter the stator pack is centered and fastened within the casing; then, both head plates, carrying the shaft bearings, are secured to the casing and the shaft having the rotor pack is co-axially secured thereto. A very precision fit machining is necessary for all components of the frame (casing and head members) and of the parts as screws, bolts, studs and the related through or dead, threaded or plain holes by which the frame components are firmly held together.

All the above machining operations, that are carried out on individual components, shall be performed with very close tolerances, above all to regard to the accurate co-axiality of assembled components. A highly accurate machining is required for the annular centering surfaces, since a constrained mutual engagement would result in irregular deformations, making also more difficult a possibly required subsequent disassembly of frame, while a too loose fit might be of prejudice for said co-axiality.

Even if however the frame components had been most precisely manufactured, the very assembling hereof would cause a defective arrangement. As a matter of fact, the use of screw engaged elements for securing such components to each other promotes localized tension and torque stresses in the same components. More particularly, if the motor casing is made of relatively thin metal sheet —as often desirable— such as steel sheet from 0.5 to 2.0 millimeters thick, for example, the direction of the pull exerted by spacedly located rods, which connect the head members and urge same against the casing, is spaced far from the cross-sectional area of the casing and induces stresses both in the casing and in the head members. Additionally, such rods, when passing inside the casing and through the stator pack, are magnetically disturbing and, when located outside the casing, unfavorably act on the head members, prejudice the outer appearence of the motor, increases its overall dimension, and so on. Still further, a very precise fitting of such rods, parallel to the motor axis, is difficult and costly.

SUMMARY

According to the invention, the assembling of electric motors can be made, sharply improved and facilitated by having said main components i.e., frame and head members) fastened with one another by a firm permanent deformation of the at least partly superposed adjoining edge portions thereof.

From another standpoint of view, the invention provides an arrangement by which the various frame components can be co-axially secured to each other by preliminarily positioning said components in a relative position, which can be termed as an "assembling position," wherein the desired co-axially is provided, and then by permanently deforming at least one of the co-abutting components, without modifying said assembly position and thereby maintaining said co-axiality.

According to a preferred embodiment of the invention, the stator casing consists of a substantially thin walled metallic tubular member, and the securing of the end portions of said member to the abutting head members is provided by inwardly clinching said end portions within recesses provided in the outer peripheral portions of said head members.

Another important advantage of this invention consists in that any clearance between the thus fastened components is positively eliminated by such fastening as obtained by said permanent deformation, and thereby the most desirable highly accurate co-axially relationship under which the components are kept while performing said permanent deformation is further improved. Another advantage consists in that none of conventional fasteners (screws, bolts, studs and the like) are needed. An added also important advantage consists in the possibility of having the casing made of a relatively thin material, without being subjected to drawbacks common to the conventional thin walled structures.

Consequently, the method according to the invention consists in that both the frame and head members are provided with abutting and centering annular surfaces, as well as with recesses wherein the adjoining portion or portions of abutting components can be tightly engaged by a permanent deformation thereof, forming such recesses undercuts by which a firm axial connection of the components is positively ensured.

The electric motors produced and assembled according to the above method are generally characterized in that their head members are secured to the casing ends by closed lock joints or by any other equivalent of engagement of abutting components, obtained by a permanent deformation of at least one of said components.

Different ways and specific procedures can be made use of for carrying the method of the invention into practice as regards both to the provision of components and their preliminary assembling in the required positions, as well as to their permanent deformation. Though the permanent connection is preferably obtained by inwardly bordering the casing i.e., toward the motor axis) for engaging its edge portions into annular grooves or notches as formed on the contour of the head plates, close to annular centering surfaces, such permanent deformation or closed lock joint might be obtained by having the edges of head plates socket-shaped and engaging them onto the casing ends that are in turn formed with suitable projections, in the manner of a spigot-and-socket joint. The closed lock joint may be formed continuously or discontinuously all along the whole contour of co-abutted components, or it may be restricted to uniformly spaced portions or points of the same contour.

In accordance with the above statements and according to another embodiment of the invention, the casing consists of a body that may be only generally defined as cylindrical, in that its cross-sectional shape may be other than circular, for example approximately polygonal, or it may show any other even more complex shape, and the cylindrical body may be formed with any arranged, dimensioned and shaped longitudinal fins.

According to such embodiment of the invention, said body is made by extrusion, and preferably of a metal that is particularly suitable for such forming procedure, such as aluminium.

The permanent deformation according to the invention may be performed on said cylindric body and on the edge portions thereof abutting with the plates, and it has been surprisingly found that the presence of even closely spaced fins, to allow for an efficient heat dissipation, does not materially interfere with the deformation necessary to provide the permanent connection between casing and head members.

In the following description of not limitative examples of the invention, as shown in the accompanying drawings, the main features of a few motors made and assembled according to the invention will be set forth.

DRAWINGS

FIG. 1 is a fragmentary, part diametrally sectioned view of said possible embodiment of the invention, with omission of the details that are not essential to the purposes thereof.

FIG. 2 is a fragmentary sectional view of components of the motor of FIG. 1, after preliminary assembly but before inwardly clinching of the casing edge portions.

FIG. 3 is a fragmentary exploded view of the not yet assembled components of same motor.

FIG. 4 is a fragmentary cross-sectional view taken in the plane indicated at IV—IV in FIG. 3.

FIG. 5 is a similar cross-sectional view taken through a modified embodiment of the head plate.

FIG. 6 is a view similar to that of FIG. 1, and illustrates another embodiment of the invention.

FIG. 7 is a cross-sectional view of the motor of FIG. 6, taken through different planes as indicated at VII—VII—VII—VII in FIG. 6.

PREFERRED EMBODIMENT

In the first embodiment of FIG. 1, the motor comprises a tubular casing 10 with the stator pack 12 fastened inside of it in known manner, and two head plates 14 (only one thereof being shown), each carrying a bearing 16 wherein the motor shaft 18 is revolvingly supported carrying the rotor pack 20. The structural components are to be prepared and assembled in such a manner as to ensure the most accurate co-axiality of the stator inner surface 22 to the rotor outer surface 24 in order to minimize and to equalize the air gap between the magnetically linked components.

As previously stated, the casing 10 can advantageously be made of thin walled steel drawn or welded tubing 26 having a relatively small wall thickness when compared with the conventionally dimensioned casings. Recourse is preferably made, for the production of the body 26, to a metal or alloy that can be permanently deformed, and wherein such deformation is rigidly maintained, at least in the edge portions 28 of the tubular body.

The head plates 14 are fitted with a peripheral rib 30, acting as a centering annulus about which the adjacent end 28 of the casing can be fitted, said rib being also formed with projections and recesses in the form of a continuous annular groove, such as indicated at 32 in FIGS. 3 and 4, or of notches suitably spaced thereon, such as indicated at 32' in FIG. 5, in order to allow for the formation of a closed lock joint between the abutting components, as indicated by the reference numeral 34 in FIG. 1 and 54 in FIGS. 6 and 7.

The closed lock joint or permanent deformation shall be performed by a force sufficient to ensure a firm grip between the thus connected components. By such a pressure grip, the necessity of maintaining close tolerances in the previous machining of components is wholly obviated or at least greatly reduced, since any possible small clearance is thus eliminated. Moreover, the pressure grip is uniformly distributed all around the head plate contour thereby preventing any danger of a change in the theoretical co-axiality conditions, that might be caused by a different tightening (or possible loosening) of screws or bolts, which are traditionally spacedly arranged thereabout to ensure said connection.

The body 26 of the casing is wholly cylindrical and uniform throughout with obvious production advantages. However, when the construction and service of the motor require more intense heat dissipation, the head plates or members may be formed with continuous or discontinuous annular projections, grooves, perforations or the like, resulting in joining recesses or undercuts.

In the second embodiment shown in FIGS. 6 and 7, head members similar to those above described are made use of and their parts are indicated by the same reference numerals.

However, the cylindrical body 46 is formed with fins 49 and the closed lock joint is formed in the points indicated by 54, that is in the intervals between adjacent fins.

As shown in FIGS. 6 and 7, the interior of the casing is cylindrical while the fin ends are circumscribed by a square having curved sides and rounded-off corners; however as previously stated, the cross-sectional shape might be different and even more complicated.

As above indicated, the components can be firstly arranged and maintained, by proper support means, in their relative arrangement and co-axiality and then subjected to clinching-in to provide the desired permanent deformation. In the new structure, an even noticeable misrotational arrangement of the head members, which are not directly connected to each other, is irrelevant and can be disregarded, providing thus a substantial saving in labor-time in the preliminary assembling of parts, provided that the co-axiality and parallelism of said head members be ensured. Further, the pressures and the stresses applied to the parts, to ensure a firm and permanent grip, are noticeably smaller than those applied by conventional tightening of bolts, nuts and threaded bars arranged in spaced relationship about the axis of the motor, and the stresses applied in the direction of the axis or parallel thereto are minimized in a structure according to the invention.

The invention has been described and shown as a not restrictive example only and it is to be understood that any equivalent application of conceptions and technical solutions that may be inferred from what is stated above, will fall within the scope of this invention.

I claim:

1. A method for assembling an electric motor having a casing of a substantially cylindrical middle component with the motor stator coaxially and fixedly secured on the interior surface thereof, said middle component having oppositely located open edge end portions, and of oppositely located essentially disk-shaped head components having peripheral portions each of said head component secured in abutting relationship with one of said edge end portions, said head components having bearing means for rotatably supporting the motor shaft and rotor coaxially to said motor stator, comprising individually manufacturing said components, providing said substantially cylindrical middle component with integrally formed cooling fins and both said middle component and said head component edge ends with portions adapted to overlap one another upon abutment of said components, providing localized and spaced recesses in each of said peripheral portions, coaxially abutting and interfitting said components to secure overlapping of said portions, and fixedly securing said components to each other by permanently deforming the overlapping edge ends into said recesses at selected points of said overlapped portions.

* * * * *